(12) United States Patent
Devasthali et al.

(10) Patent No.: US 9,560,002 B1
(45) Date of Patent: *Jan. 31, 2017

(54) PREVENTING A USER FROM MISSING UNREAD DOCUMENTS

(71) Applicant: International Business Machines Corporation, Armonk, NY (US)

(72) Inventors: Snehal S. Devasthali, Pune (IN); Jayant S. Koppikar, Pune (IN); Prasad P. Purandare, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,322

(22) Filed: Jul. 14, 2016

Related U.S. Application Data

(63) Continuation of application No. 15/045,681, filed on Feb. 17, 2016, now Pat. No. 9,438,551, which is a continuation of application No. 14/794,217, filed on Jul. 8, 2015.

(51) Int. Cl.
*H04L 12/58* (2006.01)
*H04L 12/26* (2006.01)

(52) U.S. Cl.
CPC .............. *H04L 51/24* (2013.01); *H04L 43/16* (2013.01); *H04L 51/04* (2013.01); *H04L 51/22* (2013.01)

(58) Field of Classification Search
None
See application file for complete search history.

(56) References Cited

U.S. PATENT DOCUMENTS

| 6,934,738 | B1 | 8/2005 | Furusawa et al. |
| 7,483,948 | B2 | 1/2009 | Auhagen |
| 7,650,634 | B2 | 1/2010 | Zuk |
| 8,032,602 | B2 | 10/2011 | Lavoie et al. |

(Continued)

FOREIGN PATENT DOCUMENTS

| CN | 101488868 A | 7/2009 |
| WO | 2008082205 A1 | 7/2008 |

(Continued)

OTHER PUBLICATIONS

Broida, "View Only Your (Important) Unread Messages in Gmail," PC World—Web & Communication Software, Jul. 11, 2012, p. 1-2, http://www.pcworld.com/article/259108/view_only_your_important_unread_messages_in_gmail.html, Accessed on Apr. 7, 2015.

(Continued)

*Primary Examiner* — Kaveh Abrishamkar
(74) *Attorney, Agent, or Firm* — Robert C. Bunker

(57) ABSTRACT

According to one exemplary embodiment, a processor-implemented method for informing a user that an important unread email (IUE) will be removed from an online communication inbox, wherein the IUE is a high priority email determined by an algorithm is provided. The method may include determining, by the processor, if the online communication inbox associated with the user has received the IUE. The method may also include determining if an email removal event associated with the received IUE will occur within a threshold time. The method may then include displaying a notification to the user of the email removal event based on determining that the email removal event will occur within the threshold time.

1 Claim, 10 Drawing Sheets

(56) References Cited

U.S. PATENT DOCUMENTS

| | | | |
|---|---|---|---|
| 8,291,347 B2 | 10/2012 | Bocking | |
| 8,745,161 B2 | 6/2014 | Darnell et al. | |
| 9,438,551 B1 * | 9/2016 | Devasthali | H04L 51/22 |
| | | | 709/206 |
| 2003/0149888 A1 | 8/2003 | Yadav | |
| 2004/0153431 A1 | 8/2004 | Bhogal et al. | |
| 2005/0132010 A1 | 6/2005 | Muller | |
| 2008/0005249 A1 | 1/2008 | Hart | |
| 2009/0125602 A1 | 5/2009 | Bhatia et al. | |
| 2009/0177617 A1 | 7/2009 | Lee | |
| 2010/0211592 A1 | 8/2010 | Brownlee | |
| 2012/0245925 A1 | 9/2012 | Guha et al. | |
| 2012/0331398 A1 | 12/2012 | Madnani | |
| 2013/0166657 A1 | 6/2013 | Tadayon | |
| 2013/0218986 A1 | 8/2013 | Sobhani | |
| 2015/0082192 A1 | 3/2015 | Tsuruta | |
| 2015/0200899 A1 | 7/2015 | Sanketi | |

FOREIGN PATENT DOCUMENTS

| | | |
|---|---|---|
| WO | 2012078920 A1 | 6/2012 |
| WO | 2014206143 A1 | 12/2014 |

OTHER PUBLICATIONS

ClearContext, "Alerts: Never Miss an Important Email Reply Again," ClearContext User Guide, p. 1-2, ClearContext Corporation, http://www.clearcontext.com/user_guide/alerts.html, Accessed on Apr. 6, 2015.

Constine, "Facebook Displaying Unread Messages from Pages in a New Updates Module," Social Times, Jan. 13, 2011, p. 1-3, Adweek Network, http://www.adweek.com/socialtimes/page-messages-unread-updates/255030, Accessed on Apr. 6, 2015.

Eudora, "X Eudora Settinas," Eudora Support, p. 1-25, http://www.eudora.com/techsupport/mac/download/X-Eudora-Settings.txt, Accessed on Apr. 7, 2015.

Mell et al., "The NIST Definition of Cloud Computing," National Institute of Standards arid Technology, Sep. 2011, p. 1-3, Special Publication 800-145.

IBM, "List of IBM Patents or Patent Applications Treated as Related (Appendix P)," Jul. 28, 2016, p. 1-2.

Devasthali et al., "Preventing a User From Missing Unread Documents," Application and Drawings, Filed on Jul. 8, 2015, 39 Pages, U.S. Appl. No. 14/794,217.

Devasthali et al., "Preventing a User From Missing Unread Documents," Application and Drawings, Filed on Feb. 17, 2016, 36 Pages, U.S. Appl. No. 15/045,681.

* cited by examiner

PREVENTING A USER FROM MISSING UNREAD DOCUMENTS

BACKGROUND

The present invention relates generally to the field of computing, and more particularly to email management.

In many instances, managing email can be a difficult and time consuming process for users. For users who receive a large number of emails, important emails that need immediate attention can be overlooked. When faced with a large volume of emails or other distractions, the user may neglect to respond to emails that require a response within a specific amount of time.

SUMMARY

According to one exemplary embodiment, a processor-implemented method for informing a user that an important unread email (IUE) will be removed from an online communication inbox, wherein the IUE is a high priority email determined by an algorithm is provided. The method may include determining, by the processor, if the online communication inbox associated with the user has received the IUE. The method may also include determining if an email removal event associated with the received IUE will occur within a threshold time. The method may then include displaying a notification to the user of the email removal event based on determining that the email removal event will occur within the threshold time.

According to another exemplary embodiment, a computer system for informing a user that an important unread email (IUE) will be removed from an online communication inbox, wherein the IUE is a high priority email determined by an algorithm is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining if the online communication inbox associated with the user has received the IUE. The method may also include determining if an email removal event associated with the received IUE will occur within a threshold time. The method may then include displaying a notification to the user of the email removal event based on determining that the email removal event will occur within the threshold time.

According to yet another exemplary embodiment, a computer program product for informing a user that an important unread email (IUE) will be removed from an online communication inbox, wherein the IUE is a high priority email determined by an algorithm is provided. The computer program product may include one or more computer-readable storage devices and program instructions stored on at least one of the one or more tangible storage devices, the program instructions executable by a processor. The computer program product may include program instructions to determine if the online communication inbox associated with the user has received the IUE. The computer program product may also include program instructions to determine if an email removal event associated with the received IUE will occur within a threshold time. The computer program product may then include program instructions to display a notification to the user of the email removal event based on determining that the email removal event will occur within the threshold time.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
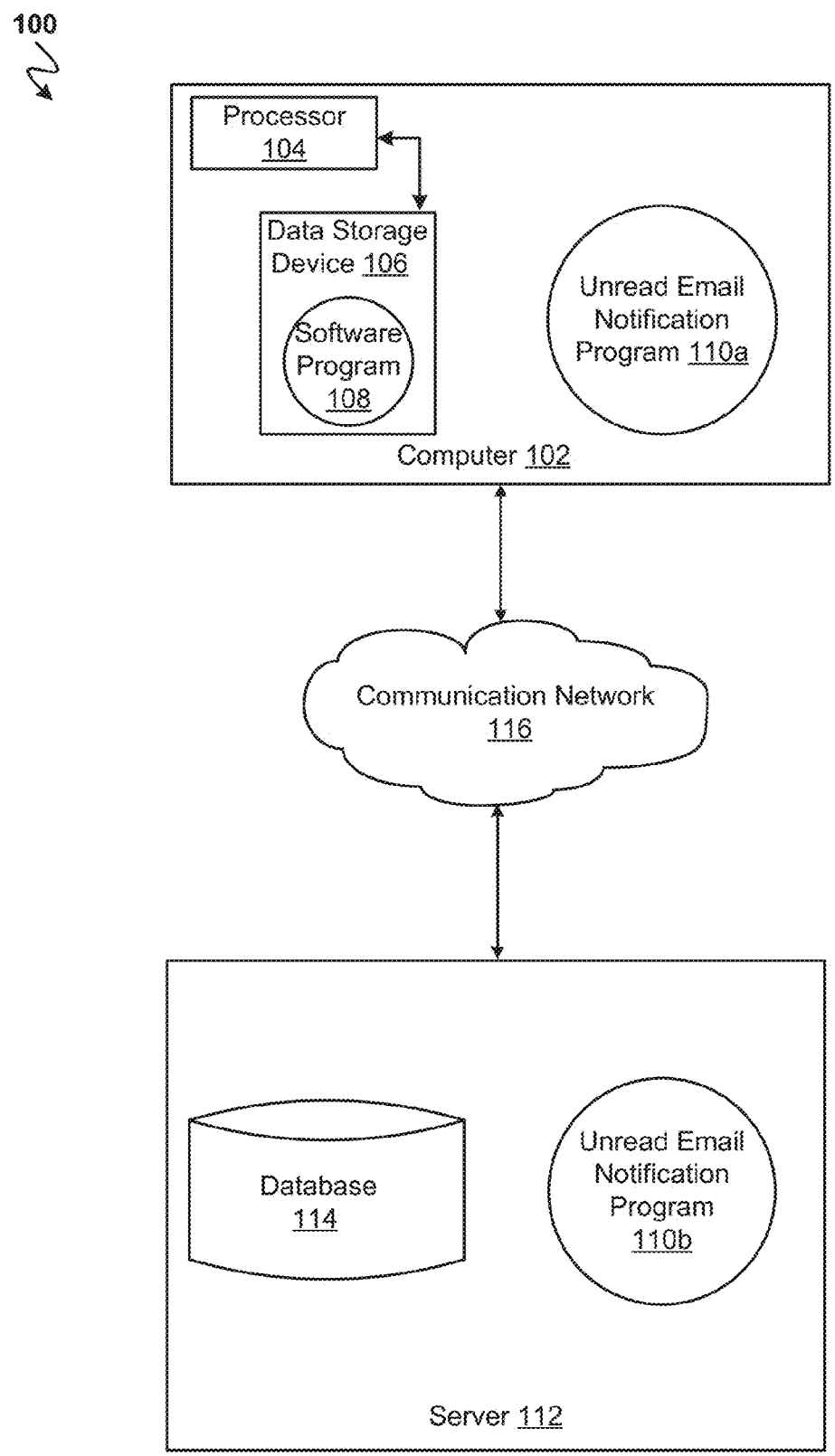
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for preventing users from missing unread documents. As such, the present embodiment has the capacity to improve the technical field of email (or other electronic message) management by automatically alerting a user of important unread emails that will be deleted or archived. More specifically, a tool tip may be added to the user's email inbox (i.e., online communication inbox, whereby an online communications inbox may include any online message transmission and storage system, such as instant messaging, social media sites, blogs, emails, etc.) to indicate that number important emails will be archived/deleted in N days containing a link that the user can click that will present the user with the unread important emails.

As described previously, managing email can be a difficult and time consuming process for users. For users who receive a large number of emails, important emails that need immediate attention can be overlooked. When dealing with a large volume of emails or other distractions, the user may neglect to respond to emails that require a response within a specific amount of time.

For instance, a user may receive an email from a manager and may postpone reading and responding to the message due to some pressing task. As the user fails to respond in a timely fashion, more such messages may be received by the user. In a different scenario, a user may be out of the office and unable to take action on important emails that may be archived or deleted while the user is away. In another scenario, a user may receive emails that are marked as "action required" while the user is occupied with other priority tasks that distract the user from responding before the emails are archived and the emails are removed from the user's inbox leading to the user forgetting about sending a response. In such scenarios, important unread emails may be deleted or archived and thus removed from the user's inbox before the user has a chance to read the emails, many time occurring without the user being aware that important emails will soon be removed before the user has read them.

Therefore, it may be advantageous to, among other things, provide a way to alert a user concerning unread important documents before the user misses the opportunity to read important unread emails.

According to at least one embodiment, emails that a user has received are analyzed to determine the emails that are unread. Known methods may be used to determine if emails in a user's inbox are unread, such as invoking an application program interface (API) to identify unread emails and provide details associated with the unread emails that will be used to determine the importance of the unread emails.

Once the unread emails and associated email data has been provided, the email data may be analyzed to determine and assign an importance value to each unread email. The importance value assigned to an unread email may be determined using known methods. For example, using social collaborative analytics may be used to determine the importance of unread emails. Social collaborative data may be extracted from interactions made between the user and other persons via instant messaging, phone call history, email communications, social network connectivity, etc. Additionally, when used in email systems operated by organizations, the organization's hierarchy may be used to determine the importance of unread email (e.g., unread emails from the user's manager may be assigned a high importance value).

In the case when a user's emails are deleted or archived on a regularly scheduled time interval, the amount of important unread emails (IUEs), as determined previously, may be displayed as a notification indicating to the user that N important unread emails will be deleted/archived in X days (where X days may be the number of days until the deletion/archiving will occur). The notification may be set to display a determined number of days before the deletion/archive event (i.e., email removal event) occurs. The number of days before the deletion/archive event that the notification may be displayed to the user may be set by the user, an administrator, by an algorithm, etc.

The displayed notification may also be a clickable link that the user may click to have the unread important emails displayed. The displayed unread emails may open in a new window, a new tab, the current inbox displayed may change to show the unread important emails, or some other user interface method may be utilized to direct the user to the unread important emails.

If the user does not handle the unread important emails before deletion/archiving occurs, a dialog box or other notification may be displayed to the user before the deletion/archiving event. The dialog box may display a message indicating that some important (i.e., priority) unread emails are about to be deleted/archived and present the user with clickable buttons to indicate the user's choice of how to proceed. For example, the user may be given the option to delete/archive all emails except the important unread emails, to postpone the deletion/archive event for X days, or to proceed with the deletion/archiving including any unread important emails.

According to at least one other embodiment, when a user begins typing in an email address in an email client (e.g., when the user is entering the destination email address for a new email) with a type-ahead (i.e., autocomplete) input field feature, the number of unread important emails may be displayed that originate from the email address the user is entering or the email address displayed by the type-ahead feature. Additionally, the displayed number of unread important emails may be a clickable link as described previously that, when clicked, may display the unread important emails to the user.

According to yet another embodiment, a notification may be displayed to the user indicating the number of important unread emails at a predetermined time interval. For example, the predetermined time interval may be every week on Wednesday whereupon a notification is displayed to the user in the user's email client that indicates the number of important unread emails. Additionally, the notification may be a clickable link as described previously that, when clicked, may display the unread important emails to the user.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an unread email notification program 110*a*. The networked computer environment 100 may also include a server 112 that is enabled to run an unread email notification program 110*b* that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the unread email notification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the unread email notification program 110a, 110b (respectively) to alert the user before important unread emails are removed from the user's inbox due to deletion, archiving, being marked as unsolicited bulk emails, etc. The unread email notification method is explained in more detail below with respect to FIGS. 2-7.

Figure 2:
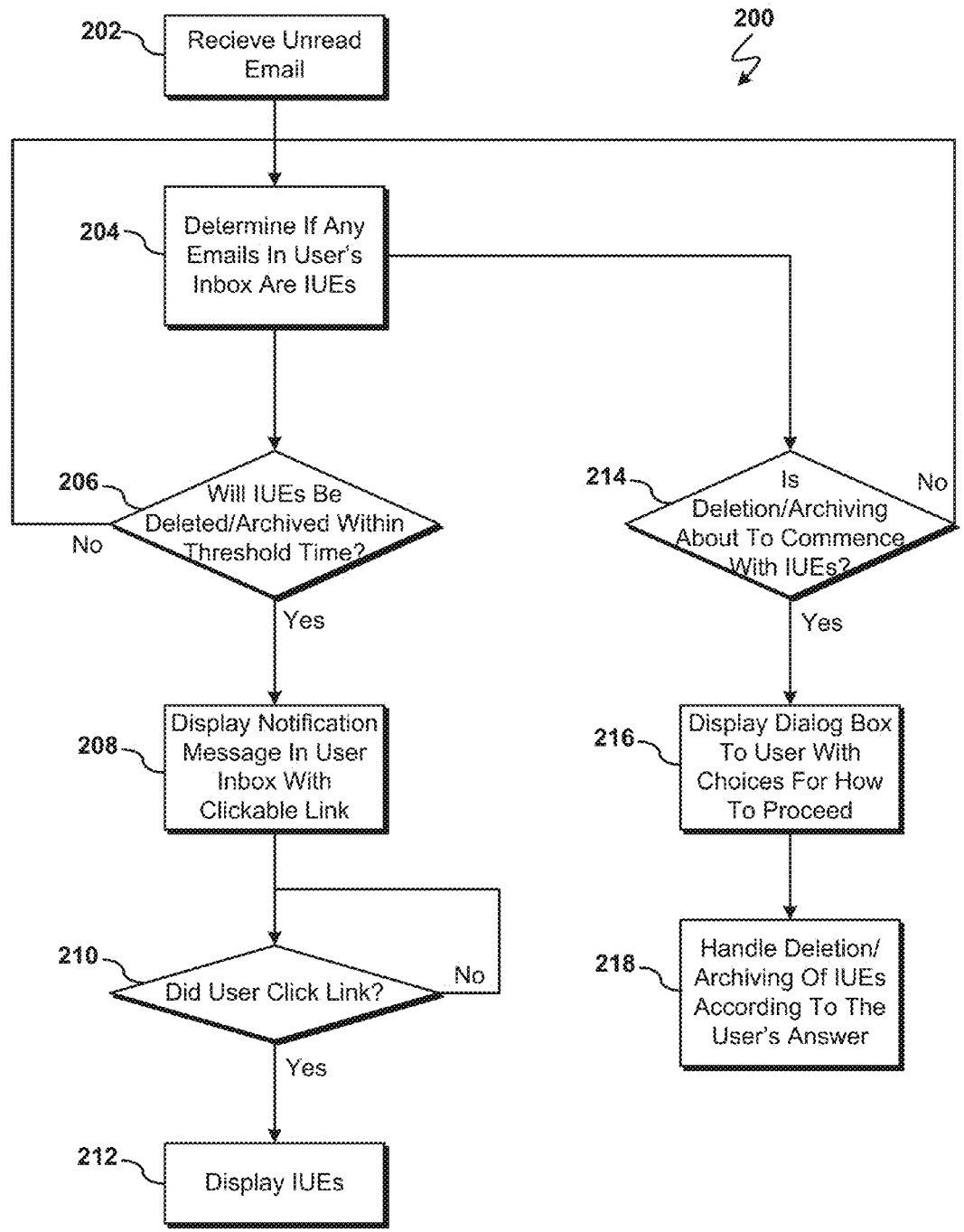
FIG. 2 is an operational flowchart illustrating a process for alerting a user about important unread emails (IUEs) marked for deletion/archiving to at least one embodiment.

Referring now to FIG. 2, an operational flowchart illustrating the steps to display a notification alerting a user with important unread emails (IUEs) of an impending deletion/archive event 200 used by the unread email notification program 110a and 110b (FIG. 1) according to at least one embodiment is depicted.

At 202, email received by the user is analyzed. According to at least one embodiment, emails that a user has received are analyzed to determine the emails that are unread. Known methods may be used to determine if emails in a user's inbox are unread, such as invoking an application program interface (API) to identify unread emails and provide details associated with the unread emails that will be used to determine the importance of the unread emails.

Next, at 204, the unread emails and associated email data that has been provided is analyzed to determine if there are any important unread emails (IUEs) in the user's inbox. According to at least one embodiment, determining which emails are IUEs may be done using known methods. For example, using social collaborative analytics may be used to determine the importance of unread emails. Social collaborative data may be extracted from interactions made between the user and other persons via instant messaging, phone call history, email communications, social network connectivity, etc. Additionally, when used in email systems operated by organizations, the organization's hierarchy may be used to determine the importance of unread emails (e.g., unread emails from the user's manager may be assigned a high importance value).

Then, at 206, it is determined if one or more IUEs in the user's inbox are designated for deletion or archiving (e.g., due to automated email management, user actively marking the email to delete/archive, etc.) in a threshold time. According to at least one embodiment, the threshold time may be a predetermined number of days before a deletion/archive event will occur (e.g., 7 days). If the user has any IUEs that are in the user's email inbox at 204, the next scheduled deletion/archive event may be queried to determine if the deletion/archive event will occur within the threshold time (e.g., in the next 7 days). For example, if a user has 20 IUEs in the user's inbox, the email service's scheduler may be queried to determine when the next deletion/archive event for the user's inbox is scheduled. If the deletion/archive event query returns a value (e.g., 6 days) that is within the threshold time (e.g., 7 days), it is determined that IUEs will be deleted/archived within the threshold time.

If it was determined that important unread emails are designated for deletion at 206, a notification message is displayed in the user's inbox with a clickable link at 208. According to at least one embodiment, a message may be displayed to the user within the user's email client that indicates the number of IUEs that are in the inbox as well as the amount of time remaining before the indicated event (e.g., deletion or archiving) occurs. Additionally, the displayed message may be a clickable link. An example of the displayed message is described in further detail below with respect to FIG. 5.

However, if it was determined that no IUEs are scheduled to be deleted/archived within the threshold time, the process may return to step 204 to determine if there are any new IUEs.

Next, at 210, it is determined if the user clicked on the link within the message displayed at 208. According to at least one embodiment, determining if the user clicked (or otherwise interacted with the link) may be handled using known click detection methods. If no click has been detected, the process may wait until a click is detected.

If it was determined that the user clicked the link at 210, the user's IUEs are displayed to the user at 212. According to at least one embodiment, the user's IUEs may be displayed to the user within the user's email client (e.g., replacing the displayed user inbox listing all of the user's email to displaying a listing of the user's IUEs). According to at least one other embodiment, a new window may be opened displaying a list of the user's IUEs. According to yet another embodiment, the user's email client may open a listing of the user's IUEs in a new tab.

At 214, it is determined if the deletion/archive event is about to commence with one or more IUEs in the user's inbox. According to at least one embodiment, at the start of a deletion/archiving event, a deletion/archiving event indicator may be generated by the scheduler that may be read to determine that a deletion/archive event is beginning. According to at least one other embodiment, the queried time of the event received at 206 may be stored and compared with a clock to determine with the deletion/archive event will occur.

If it is determined that a deletion/archive event is about to commence at 214, a dialog box is displayed to the user with choices to allow the user to indicate how the user wants IUEs to be handled with regards to the deletion/archive event at 216. According to at least one embodiment, the user may be presented with a dialog box indicating that IUEs are going to be deleted/archived. Additionally, buttons may be presented for the user to click on in order to indicate the user's preference for how to proceed. An example dialog box is described in detail below with respect to FIG. 5.

However, if it is determined that a deletion/archive event is not about to commence at 214, the process will return to 204 to check for additional IUEs.

Then, at 218, the deletion/archiving of IUEs is handled according to the user's answer to the dialog box at 216. According to at least one embodiment, the user may be given the option to delete/archive all emails except the IUEs, postpone the deletion/archive event (thus giving the user time to read the IUEs), or deleting/archiving all emails including any IUEs. The deletion/archive event may thus be altered with respect to the IUEs based on the choice the user selects.

Figure 3:
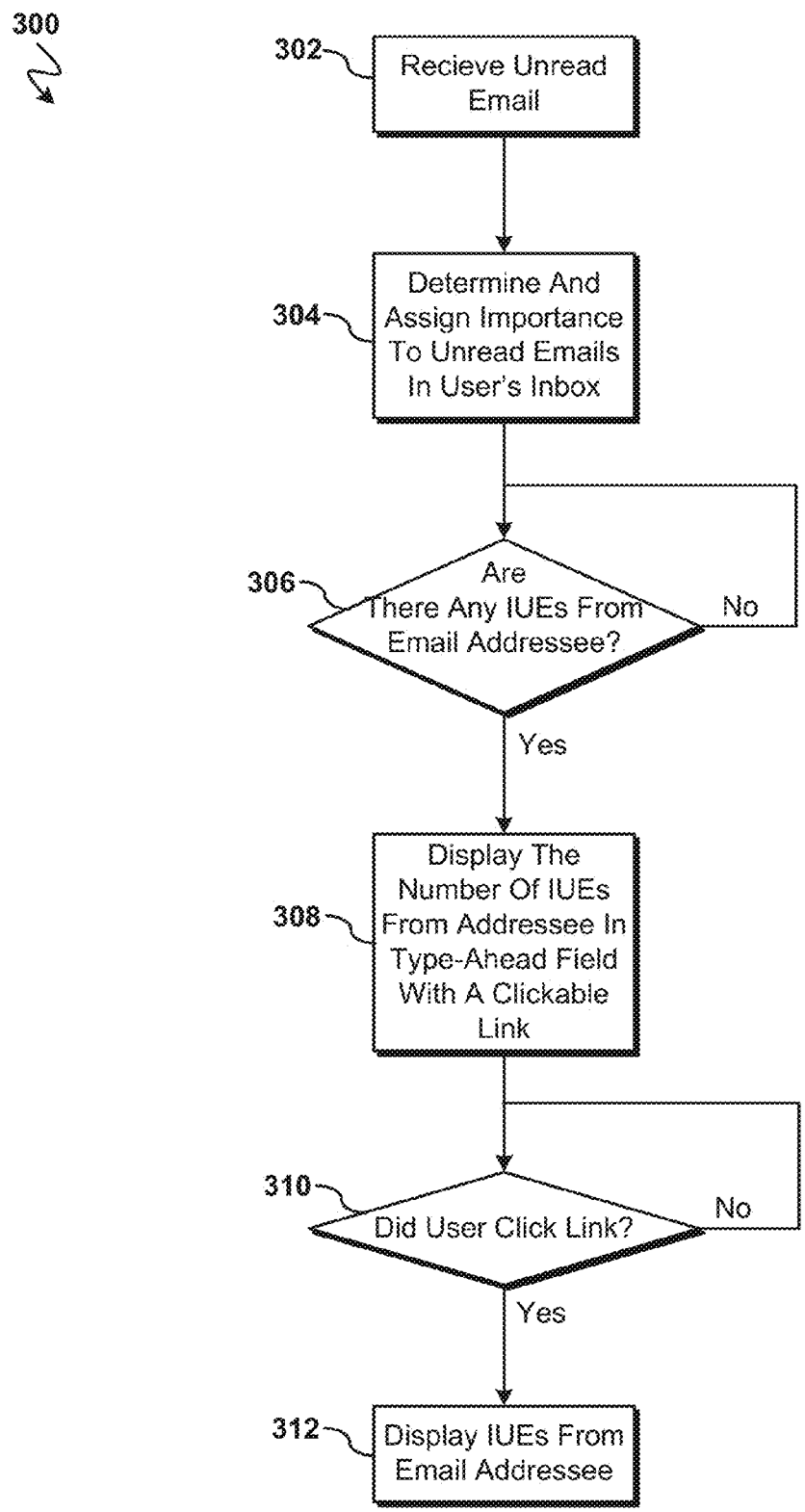
FIG. 3 is an operational flowchart illustrating a process for alerting a user about IUEs in a type-ahead field according to at least one embodiment.

Referring now to FIG. 3, an operational flowchart illustrating the steps to display a notification alerting a user with important unread emails (IUEs) corresponding with an email addressee 300 used by the unread email notification program 110a and 110b (FIG. 1) according to at least one embodiment is depicted.

At 302, email received by the user is analyzed. According to at least one embodiment, emails that a user has received are analyzed to determine the emails that are unread. Known methods may be used to determine if emails in a user's inbox are unread, such as invoking an application program interface (API) to identify unread emails and provide details associated with the unread emails that will be used to determine the importance of the unread emails.

Next, at 304, the unread emails and associated email data that has been provided is analyzed to determine if there are any important unread emails (IUEs) in the user's inbox. According to at least one embodiment, determining which emails are IUEs may be done using known methods. For example, using social collaborative analytics may be used to determine the importance of unread emails. Social collaborative data may be extracted from interactions made between the user and other persons via instant messaging, phone call history, email communications, social network connectivity, etc. Additionally, when used in email systems operated by organizations, the organization's hierarchy may be used to determine the importance of unread emails (e.g., unread emails from the user's manager may be assigned a high importance value).

Then, at 306, it is determined if there are any IUEs from an email addressee found by a type-ahead (or equivalent) algorithm. According to at least one embodiment, email client software, or other software a user uses to compose an email, may provide a known type-ahead or autofill feature as the user enters an email addressee (i.e., intended recipient of the email). As the user begins to enter character corresponding to the addressee, the type-ahead algorithm may search known email addresses for potential matches and display them in the field the user is entering the addressee. Thus, the addressee may be displayed to the user before the user completely enters the address of the addressee. Potentially matching addressees may be listed (e.g., the top 4 closest matches) in the email address entry field. From the potential addressees listed, a list of IUEs in the user's inbox may be searched to find any matches (i.e., the predicted addressee has the same email address as one or more IUEs in the user's inbox).

If it is determined that there are not any IUEs from any potential addressees listed in the type-ahead field at 306, the process will continue checking for IUEs that match identified potential addressees as new potential addressees are identified.

However, if it is determined that there are IUEs from any potential addressees listed in the type-ahead field at 306, a notification is displayed to the user in the type-ahead field indicating how many IUEs there are from the potential addressee as a clickable link at 308. The displayed clickable link indicating the number of IUEs from the addressee in the type-ahead filed is described in further detail with respect to FIG. 6.

Next, at 310 it is determined if the user clicked the clickable link displayed in the type-ahead field. According to at least one embodiment, the process will continue checking if the user clicked the link at predetermined time intervals using known algorithms. According to at least one other embodiment, the process will use known interrupt algorithms to determine if the user clicked on the link in the type-ahead field to the user's IUEs. It may be appreciated that other known click detection algorithms may be used or a combination of algorithms.

If it is determined that the user has not clicked on the link displayed in the type-ahead field at 310, the process may regularly recheck to determine if the user has clicked the link.

However, if it is determined that the user has clicked the link displayed in the type-ahead field at 310, the user's IUEs are displayed to the user at 312. According to at least one embodiment, the user's IUEs may be displayed to the user within the user's email client (e.g., replacing the displayed user inbox listing all of the user's email to displaying a listing of the user's IUEs). According to at least one other embodiment, a new window may be opened displaying a list of the user's IUEs. According to yet another embodiment, the user's email client may open a listing of the user's IUEs in a new tab.

Figure 4:
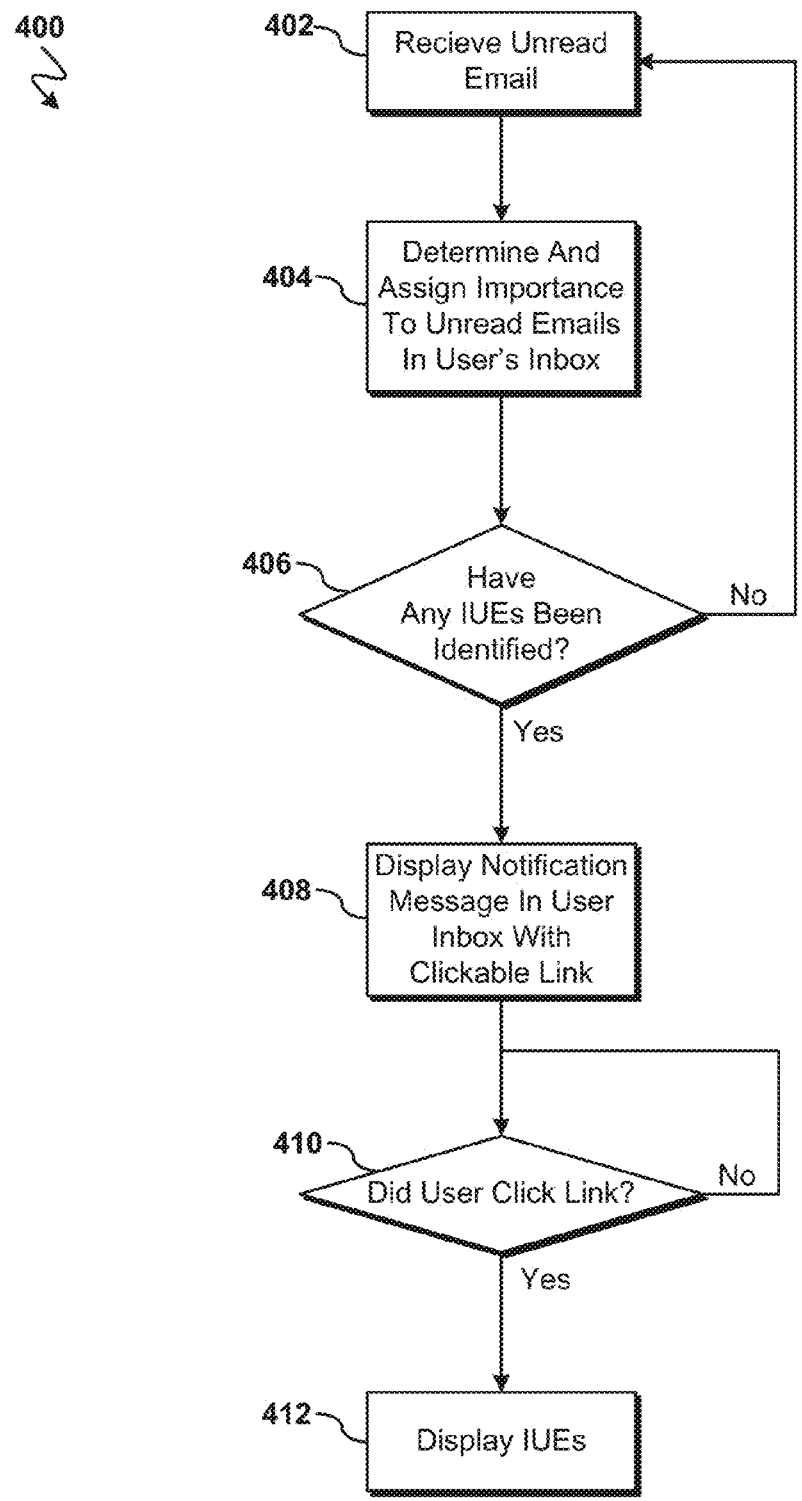
FIG. 4 is an operational flowchart illustrating a process for alerting a user about IUEs in the user's inbox according to at least one embodiment.

Referring now to FIG. 4, an operational flowchart illustrating the steps to display a notification alerting a user with important unread emails (IUEs) 400 used by the unread email notification program 110a and 110b (FIG. 1) according to at least one embodiment is depicted.

At 402, email received by the user is analyzed. According to at least one embodiment, emails that a user has received are analyzed to determine the emails that are unread. Known methods may be used to determine if emails in a user's inbox are unread, such as invoking an application program interface (API) to identify unread emails and provide details associated with the unread emails that will be used to determine the importance of the unread emails.

Next, at 404, the unread emails and associated email data that has been provided is analyzed to determine if there are any important unread emails (IUEs) in the user's inbox. According to at least one embodiment, determining which emails are IUEs may be done using known methods. For example, using social collaborative analytics may be used to determine the importance of unread emails. Social collaborative data may be extracted from interactions made between the user and other persons via instant messaging, phone call history, email communications, social network connectivity, etc. Additionally, when used in email systems operated by organizations, the organization's hierarchy may be used to determine the importance of unread emails (e.g., unread emails from the user's manager may be assigned a high importance value).

Then, at 406, it is determined if any IUEs were identified at 404. If no IUEs were identified, the process will return to 402 to handle any new emails.

However, if it is determined that there are one or more IUEs at 404, a notification message is displayed in the user's inbox with a clickable link at 408. According to at least one embodiment, a message may be displayed to the user within the user's email client that indicates the number of IUEs that are in the inbox. Additionally, the displayed message may be a clickable link. An example of the displayed message is described in further detail with respect to FIG. 7.

Next, at 410, it is determined if the user clicked on the link within the message displayed at 408. According to at least one embodiment, determining if the user clicked (or otherwise interacted with the link) may be handled using known click detection methods. If no click has been detected, the process may wait until a click is detected.

If it was determined that the user clicked the link at 410, the user's IUEs are displayed to the user at 412. According to at least one embodiment, the user's IUEs may be displayed to the user within the user's email client (e.g., replacing the displayed user inbox listing all of the user's email to displaying a listing of the user's IUEs). According to at least one other embodiment, a new window may be opened displaying a list of the user's IUEs. According to yet another embodiment, the user's email client may open a listing of the user's IUEs in a new tab.

Figure 5:
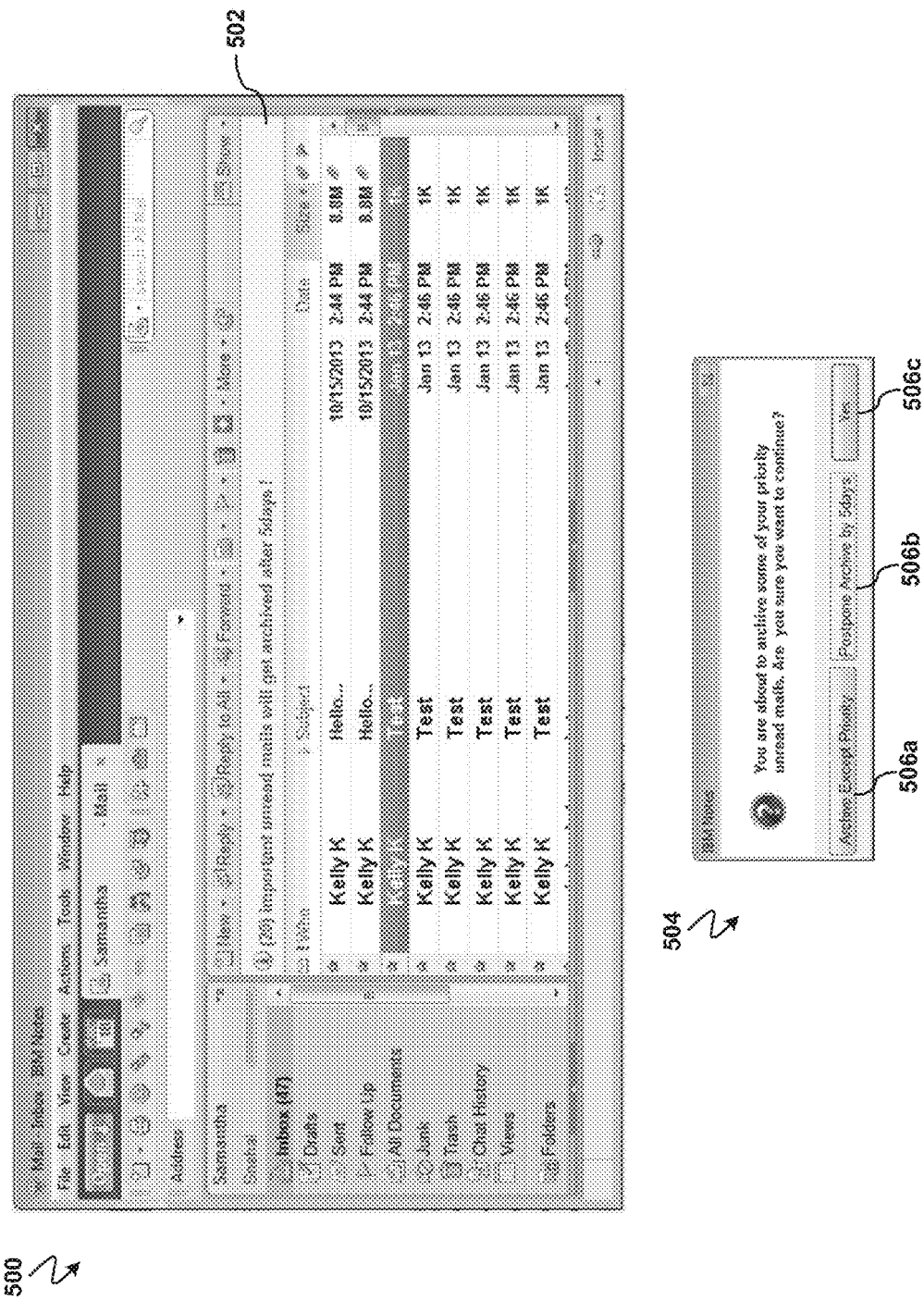
FIG. 5 is an example illustrating a graphical user interface (GUI) notifying the user about IUEs that will be deleted/archived according to at least one embodiment.

Referring now to FIG. 5, an email client inbox 500 showing an example important unread email (IUE) and deletion/archive event notification 502 according to at least one embodiment is depicted.

As described previously at 208 (FIG. 2), the IUE and deletion/archive event notification 502 is displayed to the user in the user's inbox 500 with a clickable link. As shown in the example IUE and deletion/archive event notification 502, the number of IUEs are displayed (i.e., 20), the event that is upcoming (i.e., archive event), and the amount of time before the event (i.e., 5 days). The user may then click on the link to view their IUEs as described above previously.

Once a deletion/archive event is about to occur, a dialog box 504 is displayed in the email client as previously described at 216 (FIG. 2). The example dialog box 504 shown indicates the event that is about to commence (i.e., archive event) that will affect some of the important (i.e., priority) unread emails.

Additionally, the dialog box 504 provides buttons 506a-c for the user to indicate how the user wants the event to handle the IUEs. For example, the user may be given buttons 506a-c presenting the user with the choice to "archive except priority" 506a (i.e., allow the event to commence except for the IUEs), "postpone archive by 5 days" 506b (i.e., postpone the event for N days), and "yes" 506c (i.e., proceed with the event without treating the IUEs any differently from the rest of the emails in the user's inbox).

Figure 6:
FIG. 6 is an example illustrating a GUI notifying the user about IUEs in a type-ahead field according to at least one embodiment.

Referring now to FIG. 6, an email client new message tab 600 showing type-ahead field 602 with an example important unread email (IUE) notification 604 according to at least one embodiment is depicted.

As described previously at 308 (FIG. 3), an IUE notification 604 is displayed in a type-ahead field 602 when a potential addressee is identified and listed in the type-ahead field 602 (e.g., John Smith) that has sent one or more IUEs to the user. The IUE notification 604 displays the number of IUEs received from the email address (i.e., 5). Additionally, the IUE notification 604 may be a clickable link that the user may use to view their IUEs, as described above previously.

Figure 7:
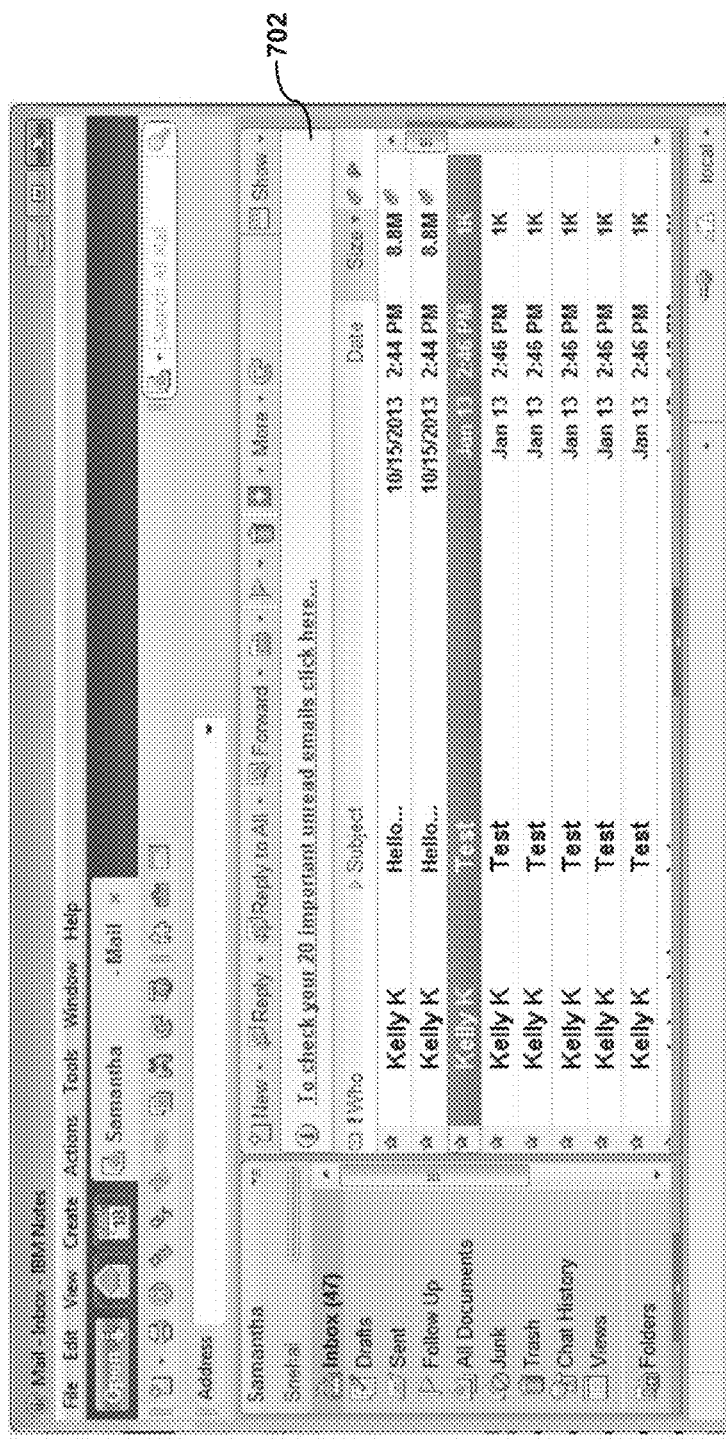
FIG. 7 is an example illustrating a GUI notifying the user about IUEs in the user's inbox according to at least one embodiment.

Referring now to FIG. 7, an email client inbox 700 showing an example important unread email (IUE) notification link 702 according to at least one embodiment is depicted.

As described previously at 408 (FIG. 4), the IUE notification link 702 is displayed to the user in the user's inbox 700 as a clickable link. As shown in the example IUE notification link 702, the number of IUEs are displayed (i.e., 20) to the user. The user may then click on the link to view their IUEs as described above previously.

It may be appreciated that FIGS. 2-7 provide only an illustration of a few embodiments and does not imply any limitations with regard to how different embodiments may be implemented. Many modifications to the depicted embodiment(s) may be made based on design and implementation requirements.

Figure 8:
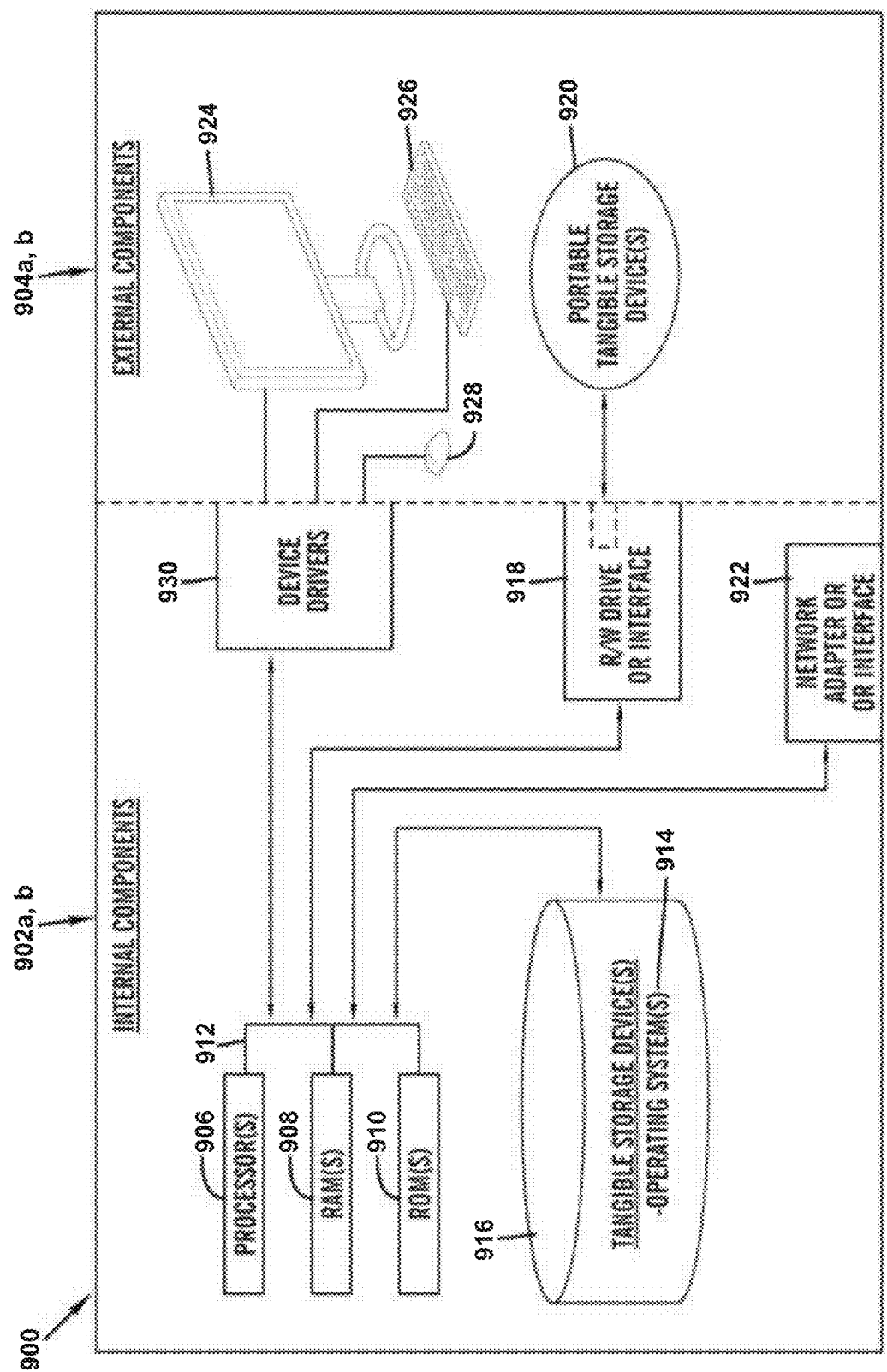
FIG. 8 is a block diagram of internal and external components of computers and servers depicted in FIG. 1 according to at least one embodiment.

FIG. 8 is a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 8. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the unread email notification program 110a (FIG. 1) in client computer 102 (FIG. 1) and the unread email notification program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the unread email notification program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the unread email notification program 110a (FIG. 1) in client computer 102 (FIG. 1) and the unread email notification program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the unread email notification program 110a (FIG. 1) in client computer 102 (FIG. 1) and the unread email notification program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
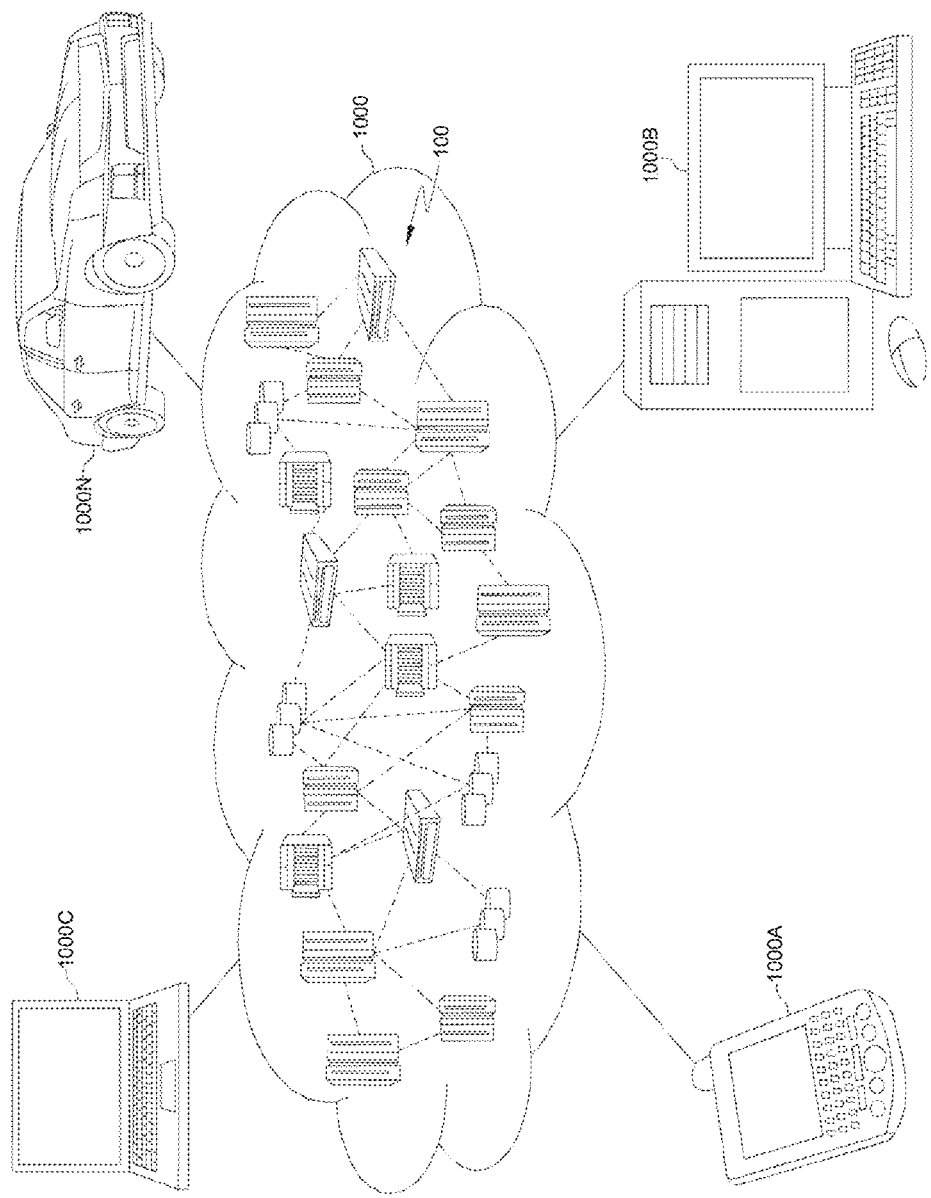
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
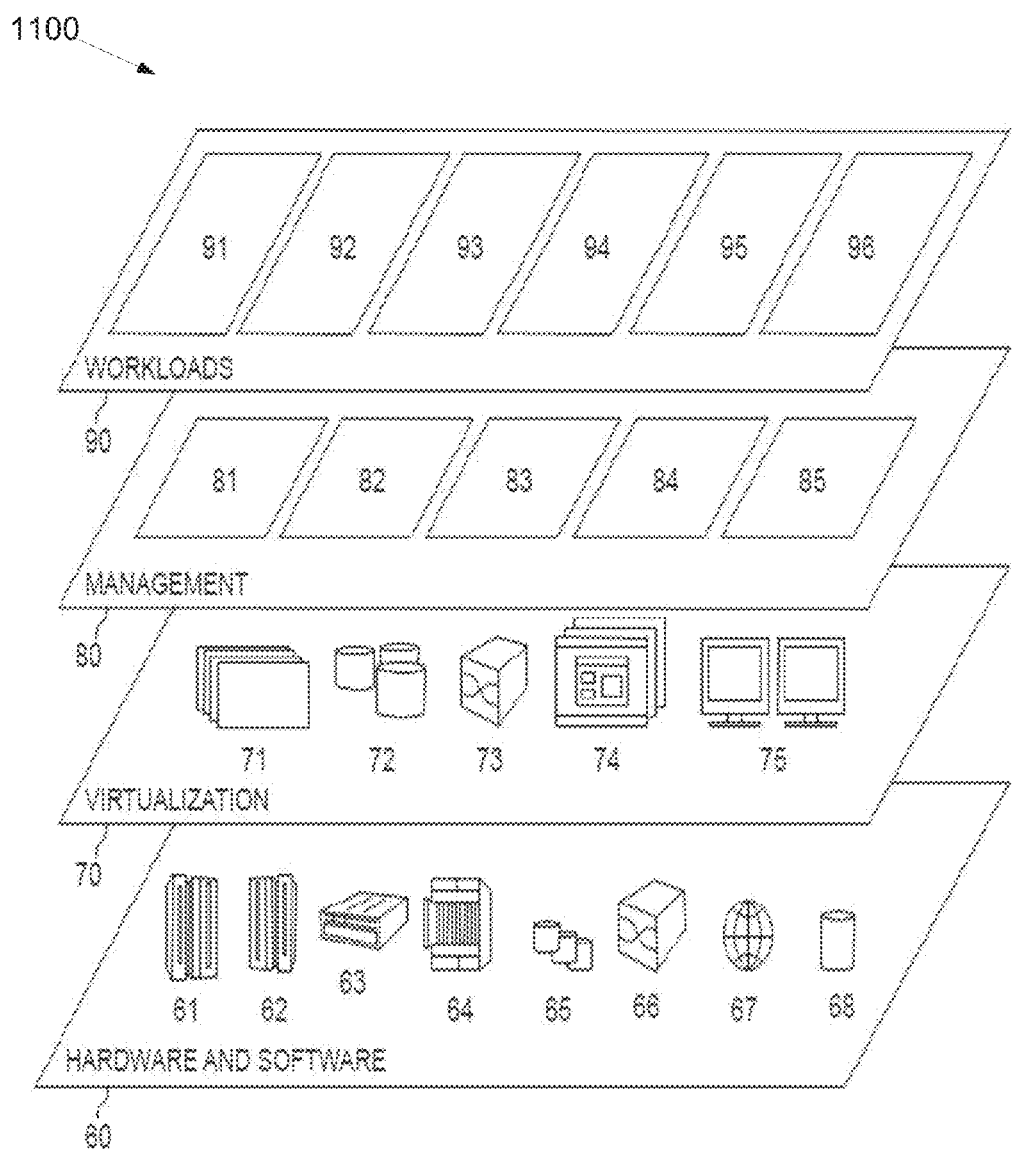
FIG. 10 is a block diagram of functional layers of the illustrative cloud computing environment of FIG. 9, in accordance with an embodiment of the present disclosure.

Referring now to FIG. 10, a set of functional abstraction layers 1100 provided by cloud computing environment 1000 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unread email notification 96. An unread email notification program 110a, 110b (FIG. 1) provides a way to notify users about important unread emails.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for informing a user that an important unread email (IUE) will be removed from an online communication inbox, wherein the IUE is a high priority email determined by an algorithm, comprising:

one or more non-transitory computer-readable storage medium and program instructions stored on at least one of the one or more non-transitory tangible storage medium, the program instructions executable by a processor, the program instructions comprising:

program instructions to determine if the user has the IUE using analytics based on a plurality of social collaborative data, wherein the plurality of social collaborative data is extracted from interactions made between the user and at least one other person via at least one of instant messaging, phone call history, email communications, and social network connectivity;

program instructions to determine if an email removal event will occur within a threshold time based on determining that the user has the IUE, wherein determining if the email removal event will occur within the threshold time includes querying the next scheduled email removal event and comparing the next schedule email removal event to the threshold time, and wherein the email removal event comprises at least one of an email deletion event and an email archiving event;

program instructions to determine if the email removal event is starting based on determining the email removal event will occur within a threshold time;

program instructions to display an event notification to the user based on determining the email removal event is starting, wherein the event notification presents to the user a plurality of choices to indicate how the IUE will be processed, wherein the plurality of choices includes a first choice to delete/archive all emails except the IUE, a second choice to postpone the deletion/archive event, and a third choice to delete/archive all emails including the IUE, and wherein the displayed event notification comprises a clickable link to an IUE list;

program instructions to receive a user choice from within the plurality of choices based on the displayed event notification to the user; and program instructions to process the IUE based on the received user choice.

* * * * *